United States Patent Office 3,333,984

Patented Aug. 1, 1967

3,333,984

PROCESS FOR THE FORMATION OF IMAGES ON A SUBSTRATE

Alfred F. Kaspaul and Erika E. Kaspaul, Fairview, Pa., assignors to Minnesota Mining and Manufacturing Company, St. Paul, Minn., a corporation of Delaware No Drawing. Filed Aug. 30, 1963, Ser. No. 305,838
4 Claims. (Cl. 117—212)

This application is a continuation-in-part of applications Ser. No. 70,159, filed Nov. 18, 1960; and Ser. No. 70,227, filed on Nov. 18, 1960, both of which are abandoned.

This invention relates to methods for forming visible images upon substrate surfaces involving the selective deposition of metal vapor upon preferred latent images.

More particularly, this invention relates to methods for forming visible images which comprises producing an invisible latent image upon a substrate surface consisting of metallic atoms or procursors therefor, thereafter developing the so-produced latent image into a visible (i.e., visible to the human eye) form by selective vapor deposition of another material having a lower heat of sublimation than the metal used to form the latent image.

It is an object of the invention to provide a particularly efficient method for the recording and reproduction of images and information.

Another object of the invention is to provide a method for the production of electronic microcircuitry.

Other objects will be apparent from the disclosure hereinafter made.

Broadly speaking, in carrying out the invention, an invisible latent image in desired form is first produced upon a surface of a thermally stable substrate. The surface of the substrate is then heated to a temperature in the range of 100°–1000° C., and the latent image is developed by exposing the hot surface, bearing the latent image, to material vapor in vacuo. The vapor is preferentially deposited upon the latent image, and a visible image is produced.

The substrates which are useful in practicing the invention are those which are stable at the temperatures selected for development, at the pressures which are employed. For production of microcircuitry, they are preferably materials having (a) high dielectric strength, (b) low power factor, and are free of materials with nucleating properties. For recording information, (a) and (b) are not essential.

Preferably, those substrates which are inert, i.e., have substantially no vapor pressure and do not decompose at the temperatures and pressures used, are employed. Dielectric materials are used when the electronic circuit elements are to be produced. Substrate materials such as mica sheets, Teflon, ceramics (e.g., barium titanate, steatite); polyester films, glass, or a more complex material, such as a semiconductor film on a ceramic or mica sheet, e.g., germanium, silicon, cadmium sulfide, on a metallic strip or a ceramic, glass or mica base layer, are illustrative. In cases where complex substrates are used, of course, maximum temperatures employed are limited to those which do not damage the semiconductor properties.

The latent image of metallic atoms can be produced in ways known to the art. Thus, for example, electron beam impingement on metal oxide or halide surfaces (prenucleated, precoated surfaces) can produce latent images. Ion beams utilizing metallic ions will form latent images when they impinge on a surface. Even exposure of a substrate to vapors of solids, e.g., metals, in vacuo, gives developable images. For producing desired configurations of marks, characters, numbers or even circuit wiring diagrams, these latent image producing means can be made to operate through a mask, or by scanning and modulating in the case of ion and electron beams.

The entire process is carried out in an atmosphere of greatly reduced pressure. Ordinarily, pressures of $10^{-2}$ to $10^{-4}$ mm. Hg are satisfactory. The atmosphere can be the residual atmospheric gas, or other gases can be used such as argon, nitrogen, hydrogen, etc., or mixtures.

When precoated substrates are used, the precoating material consists of an inorganic or metal-organic (e.g., tin-tetraphenyl) nucleating agent. Nucleating agents found suitable are inorganic metallic halides and chalcogenides, e.g. oxides and sulfides. Other suitable nucleating agents include metal hydroxides. It is preferred to use metal halides and chalcogenides which have vapor pressures low enough not to interfere with the selective metal deposition during latent image development. These include materials having vapor pressures of at least about 1 mm. Hg and temperatures in the range of 500–1800° C., and having little or no vapor pressure below 50° C. Such preferred materials tend to produce the best developed images and tend to enhance the durability of the latent image during possible storage and during development. For like reasons, it is preferred to use oxides, sulfides and halides of those metals which in their free form (i.e., when the metals have a valence of zero) have vapor pressure characteristics similar to those indicated for their oxides, sulfides and halides.

In the precoating operation, at least an approximately monomolecular layer (i.e., a "monolayer") of a metal chalcogenide (such as a metal oxide or sulfide) or metal halogenide is coated, as by vapor deposition or the like, on the surface to be scanned with an electron beam to produce the latent image. If the cross-sectional area of the beam to be employed is very small, say of the order of $10^{-5}$ square centimeters, then it is desirable to have a very uniform precoating. On the other hand, if the cross-sectional area of the beam is a significant fraction of a square millimeter, say of the order of 0.005 square centimeter, the precoating may be relatively irregular.

The actual quantity of metal from the hot source to be deposited upon the surface to form the latent image is extremely small, but it varies in amount depending on the metal used and the substrate surface even in the same apparatus and under identical process conditions, so that it is not possible to specify the exact amount needed. A metal for the latent image is selected to have a heat of sublimation greater than the material which is to be used for development. While heat of vaporization might be used in making the determination or calculation in connection with the system, the heat of sublimation is more accurate for use in low pressure systems. It is also preferred that the material used to form the latent image does not dissolve into the substrate at operational temperatures. The actual time needed to form the latent image varies widely from material to material, and it is not possible to give a single time limit suitable for all of them. In general, however, the thickness of the material deposited on the surface is of the order of Angstrom units and is less than one monomolecular layer up to several monolayers.

Tantalum, chromium, nickel, cobalt, tungsten and the like metals, which have high heats of sublimation, are preferred latent image formers. Silver and gold may also be used for certain materials, as well as alloys. Materials selected from the group consisting of zinc, cadmium, magnesium, copper and silver, or PbO, PbS, CdS, $CdS_e$, $Sb_2S_3$ and $Bi_2O_3$ are preferably used in forming the visible images.

In the development step, the surface bearing the latent image is heated, exposed to vapor of the selected developing substance, preferably selected from Table I, having heat of sublimation smaller than the material used to form the latent image. The exposure time depends on the vapor pressure and the temperature of the substrate. As in the case of the latent image, it is not possible to give an exact time needed to form the visible image. This is because such time is determined by a number of different variables, including concentration of metal vapor, nature of the substrate and latent image, degree of contrast desired in the visible image, and other subjective and objective variables. In general, however, the deposition is conducted for a time sufficient to develop the latent image to the point where it has the desired thickness. The degree of contrast involved in the visible image, the purpose to which the visible image is to be placed, and similar considerations may require deposition of more metal in some cases than in others after the latent image once becomes visible. For electronic circuit elements, the electrical conductivity can be adjusted as desired by depositing metal of greater or less thickness, or by employing an oxidizing atmosphere so as to form an oxide (e.g., tin oxide) of greater resistance, thus producing a thin film resistor.

It has been found that when the substrate surface bearing the latent image is heated to a temperature in the range of about 100 to 1000° C. during development, much better contrast and definition is obtained with developer materials having a $\Delta H_s$ value >50 kcal./mole.

The following table lists materials useful for formation of latent images, and for developing these at a surface temperature of the order of about 800° K.

TABLE I

| Nucleation | | Development at ~800° K. | |
|---|---|---|---|
| Material | $\Delta H_s$ in kcal./mole | Material | $\Delta H_s$ [1] in kcal./mole |
| Sm | >50 | Pb | 47 |
| Sn | 72 | Ba | 41 |
| Be | 75 | Sb | 49 |
| Cr | 94.9 | Bi | 47.5 |
| Er | 75 | In | 58 |
| Fe | 99 | Mn | 67 |
| Pd | 89 | | |
| Ni | 101.2 | Ag | 68.2 |
| Fe | 99 | | |
| Co | 101.6 | Sn | 72 |
| Si | 107 | | |
| Ti | 112.8 | Al | 77.5 |
| Rh | 133 | | |
| U | 117.2 | Cu | 81 |
| Zr | 145 | | |
| V | 122.7 | Au | 84.7 |
| Nb | 172 | | |
| B | 128 | PbO, PbS, $PbS_e$, PbTe | |
| Ta | 186 | CdS, $CdS_e$, CdTe | |
| Ir | 150 | $Sb_2O_3$, $Sb_2S_3$ | |
| Mo | 157.5 | $Bi_2O_3$ | |
| Re | 187 | Cd | |
| W | 200 | Zn | |

[1] $\Delta H_s$ value is always smaller than the $\Delta H_s$ value for the nucleating material. Trial and error determinations suffice if the value is unknown because the absolute values are not critical.

The temperature at which maximum selectivity of deposition occurs, that is, the substrate surface temperature at which the best definition and greatest clarity of developed image is produced, varies with a number of different factors, such as type of substrate, type of nucleation sites in the latent image, material being used to develop the latent image, etc., so that it is not possible to give offhand the optimum substrate temperature for every combination of variables.

Furthermore, it has been found that the latent images can be developed by any of a very wide variety of nonmetallic materials, including metal-chalcogenide compounds, such as: $Bi_2O_3$, PbS, CdS, $CdS_e$, $CdT_e$, $Sb_2S_3$. Even organic dyestuffs, such as the phthalocyanine dyes, can be selectively deposited upon a substrate bearing latent images. In general any material may be selectively deposited upon such substrates bearing latent metallic images provided that it is vaporizable and has a heat of sublimation smaller than the latent image nucleation sites. Because most of these materials have rather high heats of sublimation (i.e., above that for magnesium), best developed images are produced by raising substrate surface temperatures above 100° C., the optimum temperature for a given system being determined by simple experiment or by calculation.

The rate of condensation is governed by the following equation:

$$\frac{dN_{ad}}{dt}=\dot{N}_i-\dot{N}_e=\dot{N}_i-N_{ad}\cdot A\cdot \exp.\ (-\phi_{ad}/RT)$$

where $\phi_{ad}$ represents the adsorption energy between a single atom and the surface and is assumed to be about 1/6 of the heat of sublimation; (T), the absolute temperature in degrees Kelvin; (R), the gas constant (1.9878 cal.·deg.$^{-1}$·mole$^{-1}$); and (A), a more or less temcal. · deg.$^{-1}$ · mole $^{-1}$); and (A), a more or less temperature independent constant (for zinc about $10^{14}$ at room temperature).

$\dot{N}_i$=rate of incident atoms $\dot{N}_e$=rate of reevaporating atoms $(\dot{N}_e=N_{ad}\cdot A\cdot \exp(-\phi_{ad}/RT))$ $N_{ad}$=number of adsorbed surface atoms So that:

$$\dot{N}_i=N_{ad}\cdot A\cdot \exp(-\phi_{ad}/RT) \qquad (2)$$

and converting to logarithms of base 10:

$$\log \frac{\dot{N}_i}{N_{ad}}=\log A-(0.434)\cdot(\phi_{ad}/RT) \qquad (3)$$

It is understandable from Equation 3 that if $\phi_{ad}$ of the developing vapor is doubled then the substrate surface temperature has to be doubled to obtain the same numbers of atoms deposited.

While reference is made to the heat of sublimation ($\phi_{ad}\sim\frac{1}{6}\Delta H_s$), since this is a useful and convenient criterion for selection of the materials to be used, it will be apparent that surface energies or energy of adsorption (sticking coefficients) are involved. The substrate surface temperature and its surface adsorption energies affect the choice of materials to be used for vapor coating as well as the true temperature of the impinging beam. In general, the depositing material used should have a heat of sublimation which is not greater than that of either the substrate surface or the nucleation sites on this surface.

It is preferred to conduct all of the steps of the process of this invention as a part of a single operation. However, it is not necessary to conduct the individual steps of this invention continuously. Thus, for example, a recording of the latent image can be stored after its formation. A latent image can be formed upon a tape, the tape stored, and then subsequently developed as by selective vapor deposition, as described.

As used in this application the terms "heat of sublimation" and "$\phi_{ad}$ energy of adsorption" have their conventionally recognized meanings. Thus the term "heat of sublimation" refers to that quantity of heat required to convert a definite amount of material under atmospheric pressures into the gaseous state. Heats of sublimation are conventionally given in kilocalories per mole, and, since one atom has about six next neighbors on the surface, such values must be divided by six to find the value of $\phi_{ad}$ per mole. Similarly, the term $$\log \frac{\dot{N}i}{N_{ad}}$$

has reference to the ratio of the number of atoms incident per unit area and time upon a surface compared to the number of atoms adsorbed (sticking) to such surface per unit area at equilibrium.

It is preferred that the substrate surface be substantially non-porous (i.e., continuous) because it has been found that such non-porosity promotes the production of images of good optical properties. It is also preferred that the substrate be one which is substantially thermally stable, by which it is meant that the surface should best be substantially non-volatile under the temperature and pressure conditions employed, that is, the substrate can be subjected to the desired temperatures even under high vacuum conditions without undergoing appreciable chemical or physical changes which would alter the surface receptivity.

In one aspect the invention touches on the storage or reproduction of information. In this case, in general, sufficient developing vapor is deposited to produce an image which can be read out electronically, optically or magnetically.

Optical readout is accomplished by simply passing a focused beam of light through a transparent film and projecting an image upon a screen in a conventional way; or by reflected light if an opaque substrate is used.

Electronic readout can be accomplished by known techniques.

A magnetic readout can be obtained if the material image has sufficient conduction and/or magnetic susceptibility. Thus, if the substrate is magnetically hard, the developed image can be read out by conventional magnetic head scanning technique. If the substrate is magnetically soft, it can be used to modulate a magnetic core structure by change in reluctance. If the material of the visible image is nonmagnetic but electrically conductive, it can be read out magnetically by using the electrically conductive surface to alter the eddy current hysteresis characteristic curve of a scanning beam or even by utilizing secondary electron emission.

A particularly useful application of the invention is in the production of microcircuit components such as resistors, conductors forming part of an electronic circuit subassembly, and the like.

The following examples which are non-limiting as to the scope of the invention will illustrate the process and the devices produced thereby.

*Example 1*

An element suitable for use in a microcircuit is prepared as follows:

A sheet of mica about ½ inch square is placed in a vacuum chamber containing suitable electrodes and filaments, and other devices for carrying out the operations required. The mica sheet is supported upon a heating stage, which is adjustable and thermostatically controlled to maintain desired temperatures.

While maintaining the mica sheet above ambient temperature, it is subjected to a glow discharge or an electron beam to clean the surface. The pressure in the chamber is then adjusted to about $10^{-6}$ mm. Hg, and a mask having a slit cut therein in zigzag or other fashion is placed over the cleaned mica surface. Such a mask is conveniently made of Monel or other suitable material. With the mask in place, a set of electrodes connected by a tungsten wire, upon which is suspended a loop of Nichrome wire, is placed several inches above the location of the mask and the filament is heated to vaporize Nichrome, to such an extent only as to create an invisible latent image composed of Nichrome atoms upon the surface of the mica not covered by the mask. The electrodes and the mask are then removed, and the mica sheet is heated to approximately 500° C. While held at this temperature, and maintaining now a pressure of $10^{-4}$ mm. Hg with argon-hydrogen (controlled leak), a set of electrodes again bridged by a tungsten tube in which is either bismuth or bismuth oxide is placed opposite to the surface of the mica. The tungsten filament is energized and bismuth or bismuth oxide is evaporated, whereupon the bismuth vapor condenses preferentially and selectivity as bismuth oxide upon the Nichrome latent image on the mica sheet as well as the bismuth oxide. A zigzag bismuth oxide ($Bi_2O_3$) image is formed, corresponding to the shape of the opening in the mask. At a pressure of about $10^{-6}$ mm. Hg a lower bismuth oxide (BiO) is formed, rather than $Bi_2O_3$.

The bismuth oxide element thus formed functions as a magneto-resistor. If connections are made to the ends of the image as soon as visible, a measurement of the resistance can be obtained while the image is being produced in the vacuum chamber. When the resistance has reached the desired point, evaporation of bismuth is discontinued. Such a thin film resistor can be employed in electronic devices in known manner.

In another embodiment, a miniaturized electronic circuit is formed upon a wafer of barium titanate as follows:

Using a Balzers BA–500 vacuum unit provided with a bell jar containing the necessary electrodes, heating stage, mask and manipulator therefor, together with a scanned, modulated electron gun, the procedure is as follows:

A thin wafer of steatite about ½ x ½ inch square and approximately ¹⁄₁₆ inch in thickness, having a centrally located ⅛ inch square recess about ¹⁄₃₂ inch deep, is placed upon a heating stage. While maintained at approximately 300–500° C., the surface of the ceramic is covered with a monolayer of ytterbium oxide ($Yb_2O_3$) by evaporation of ytterbium at a pressure of about $10^{-4}$ mm. Hg. in the presence of 94–6% argon-hydrogen mixture. Thereafter, and while maintaining the temperature and pressure the same, an invisible, latent image is produced upon the ytterbium oxide coated surface using a scanned, modulated electron beam. The electron beam is controlled by a remote type television camera which is focused upon a circuit drawing. The image transferred consists of three resistors of zigzag line form, of which two ($R_1$ and $R_2$) extend from about the center line of opposite sides of the square recess to the edge of the wafer, also at the center line; a third resistor ($R_3$) is connected to $R_1$ adjacent to the edge of the recess and extends to the center line of another edge of the wafer. A single conductor extends from the remaining edge of the wafer, also at the center line, to the center line of the adjacent edge of the recess. In this way, an invisible latent image of the connecting resistors and wiring of a microcircuit semi-conductor switching module is produced. In the present instance, a beam voltage of about 10 kv., beam diameter of approximately 10 microns and beam current of about 100 microamps is employed. The circuit diagram is scanned using standard TV frequencies. The circuit elements are thus produced in latent image form upon the substrate by scanning for approximately ¹⁄₃₀ second with appropriate modulation.

A pair of electrodes connected by a slotted tungsten tube, in which is tin metal, is then approached to the surface of the barium titanate wafer. The substage heater is energized and the surface of the barium titanate is heated to approximately 600° C. The tungsten heater is then energized, and tin is evaporated until a distinct, visible image of the circuit corresponding to the latent image and to the circuit diagram view by the video camera, is produced. The lengths of the lines providing the resistors are so chosen as to provide the proper resistance after the subsequent "development" by vapor deposition. For the present device, a switching circuit, $R_1$ is 100 ohms, $R_2$ is 125 ohms and $R_3$ is 1000 ohms. The resistance values may be obtained by trial and error procedures, or connections can be made to an ohmmeter to follow the operation as development proceeds. The tin deposited is oxidized to tin oxide during the vapor deposition step. This operation may be facilitated by the use of a binocular microscope of moderate magnification. The substage is then permitted to cool, and a previously prepared semiconductor device of a size to fit in the recess and having short, appropriately dressed leads (PNP, germanium alloy junction transistor, having type 2N525 or similar characteristics) is dropped into the recess so that the base lead is in position to be connected to $R_1$, the collector lead in position for connection to $R_2$, and the emitter lead is in position to be connected to the plain conductor. A mask is brought over the semi-conductor crystal, with openings of suitable size located above the connecting points for the semi-conductor. A tungsten filament over which is hung a loop of aluminum wire is then approached to the mask, the filament is energized and aluminum is vaporized through the mask to join the semi-conductor leads to the circuit. This operation is conducted at about 30° C. Thereafter, the masks are removed and the miniaturized switching module is removed from the apparatus. Further treatments, such as attachment of leads to the outboard ends of the resistors, protective coatings, etc. may then be carried out.

*Example 2*

Reproduction of printed matter, or other information including such as encoded information for use with computer storage means, can be accomplished by the process of the invention as follows:

A solid substrate material, usefully in tape or strip form, is placed in an apparatus containing a supply reel, a take-up reel and a number of intermediate operating stations at which the various steps in the process are carried out. The whole device is adapted to be kept under highly reduced pressure, and in appropriate places, partitions are provided with slits through which the strip form record medium passes. These partitions prevent the deposition of metallic or other materials in unwanted areas, such as upon the interior of the apparatus and so on. Connections for pumps, supply of electric current and sources of metal ions, electron beams, vapor deposition of oxides and metals and other required mechanical arrangements are provided. The pressure in the system is maintained at about $10^{-2}$ mm. Hg, or lower.

At the first station, the tape, which may be a high-temperature plastic material which is transparent, for example, Mylar or other high temperature resistant material, including Teflon and the like; or a metallic strip, for example, an aluminum strip bearing a surface layer of mica paper adhered thereto, is precoated by vapor depositing on its surface a coating of a thin uniform layer of bismuth oxide. This layer is substantially transparent and preferably consists of one or more monolayers of an oxide such as $Bi_2O_3$.

Alternatively, the precoating of the surface may be dispensed with, and the strip may be moved directly to a latent image forming station, or nucleation zone, in which nuclei are deposited upon the strip surface, to form a latent, invisible image corresponding to the information to be recorded. This can be accomplished by use of a mask (e.g., a stencil), using vapors of a nucleating metal such as nickel or Nichrome, which is produced by heating a Nichrome loop hung over a tungsten filament until the Nichrome boils.

If the strip has been precoated, an electron beam which is scanned and modulated according to the intelligence which is to be recorded is employed to produce the invisible image. It will be apparent that in this instance the size of the image can be varied from the size of the original.

The substrate bearing the latent image is then moved from the image-forming station to the developing station, where it is exposed to vapors of a suitable developing metal, for example, iron, cadmium, zinc or the like. During the coating operation, a substage heater under the tape, or alternatively infrared surface heating means, is used to bring the surface temperature of the tape to a temperature of the order of about 500° C. if the tape has a metallic backing and microface, or a temperature of the order of about 200° C. if Mylar is used. A sufficient amount of metallic vapor is deposited upon the latent image to render it visible.

The substrate strip is then passed out of the development zone and to the storage reel. If desired, the strip can be moved continuously, while the electron beam is employed to sweep transversely across the tape. It will be apparent that continuous recording is thus accomplished. To produce optically useful images, a deposit of metal of the order of about 100 Angstrom units thick is made upon the latent image. This provides excellent visual contrast. By use of the elevated substrate temperature during the deposition step, the images produced are very much sharper and more uniform than those produced when heating is omitted.

What is claimed is:

1. A process for the formation of images on a substrate, which comprises forming an invisible latent image consisting of nuclei of atoms of a metal having high heat of sublimation upon a substrate and rendering the said latent image detectable by vapor depositing, in vacuo, and while maintaining the surface of the substrate at a temperature in the range of from 100° C. to 1000° C., a solid material having heat of sublimation lower than that of the metal of the said invisible latent image which is deposited from the vapor state to form a detectable image corresponding to the said latent image.

2. A process for the formation of images which consist essentially in the steps of producing an invisible latent image consisting of nuclei of atoms of a metal having high heat of sublimation upon the surface of a substrate, and developing the said latent image by vapor deposition of a metal having heat of sublimation lower than that of the metal of said latent image thereupon, while maintaining the substrate surface at a temperature within the range of about 100° C. to 1000° C. and at a pressure of not higher than about $10^{-2}$ mm. Hg.

3. A process for the recording and reproduction of information, which comprises forming an invisible latent image of metal atoms having a high heat of sublimation upon an inert substrate, and developing a detectable image upon the said substrate in the areas of the latent image by vapor depositing thereupon, at temperatures in the range of 100° C. to 1000° C., and at a pressure not higher than about $10^{-2}$ mm. Hg a substance of the class consisting of metals, metal halogenides and metal chalcogenides having heat of sublimation lower than that of the metal of said latent image.

4. The process for producing an electronic circuit element, which comprises forming a latent image of a circuit element upon a dielectric substrate, said latent image being composed of metallic nuclei, and, while maintaining the surface of said substrate at a temperature in the range of about 100° C. to 1000° C., and in an atmosphere having a pressure less than about $10^{-2}$ mm. Hg, exposing the said latent image on the said substrate to vapors of a substance of the class consisting of metals, metal halogenides and metal chalcogenides, to produce an electrically conductive image corresponding to the said latent image.

References Cited

UNITED STATES PATENTS

| | | | |
|---|---|---|---|
| 2,883,257 | 4/1959 | Wehe | 346—1 |
| 2,948,261 | 8/1960 | McGraw | 117—212 |

FOREIGN PATENTS

| | | |
|---|---|---|
| 767,381 | 7/1952 | Germany. |
| 295,689 | 3/1954 | Switzerland. |

ALFRED L. LEAVITT, *Primary Examiner.*

WILLIAM L. JARVIS, *Examiner.*